United States Patent
R et al.

(10) Patent No.: US 9,860,723 B2
(45) Date of Patent: Jan. 2, 2018

(54) METHOD OF NOTIFICATION OF FIRE EVACUATION PLAN IN FLOATING CROWD PREMISES

(71) Applicant: Honeywell International Inc., Morristown, NJ (US)

(72) Inventors: Murali R, Bangalore (IN); Priyanka Ashok Chinchamalatpure, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/750,375

(22) Filed: Jun. 25, 2015

(65) Prior Publication Data

US 2016/0381537 A1 Dec. 29, 2016

(51) Int. Cl.
| | | |
|---|---|---|
| *H04M 11/04* | (2006.01) | |
| *H04W 4/22* | (2009.01) | |
| *H04W 76/00* | (2009.01) | |
| *G06Q 90/00* | (2006.01) | |
| *G08B 7/06* | (2006.01) | |
| *H04W 4/04* | (2009.01) | |

(52) U.S. Cl.
CPC ............ *H04W 4/22* (2013.01); *G06Q 90/205* (2013.01); *H04W 76/007* (2013.01); *G08B 7/062* (2013.01); *H04W 4/043* (2013.01)

(58) Field of Classification Search
CPC ..... H04W 4/22; H04W 76/007; H04W 4/043; G06Q 90/205; G08B 7/062
See application file for complete search history.

(56) References Cited

U.S. PATENT DOCUMENTS

| | | | |
|---|---|---|---|
| 2009/0065578 A1* | 3/2009 | Peterson | G05B 19/048 235/382 |
| 2009/0138353 A1* | 5/2009 | Mendelson | G01C 21/206 705/14.39 |
| 2013/0169817 A1 | 7/2013 | Jones et al. | |
| 2013/0205257 A1 | 8/2013 | Albright | |
| 2013/0226451 A1 | 8/2013 | O'Neill et al. | |
| 2014/0257889 A1* | 9/2014 | Ashley, Jr. | G06Q 10/063 705/7.11 |

(Continued)

OTHER PUBLICATIONS

Business Fire Monitoring—Fire Alarm Systems—ADT NZ, ADT Security 0800 111 238, http://adtsecurity.co.nz/business-security/fire-monitoring, (9 pages) 2016, Dec. 2016.

(Continued)

*Primary Examiner* — Barry Taylor
(74) *Attorney, Agent, or Firm* — Husch Blackwell LLP

(57) ABSTRACT

A system is provided that includes a security system that protects a secured geographic area, a near field or Bluetooth device proximate an entry of the secured geographic area that captures an identifier of a wireless portable device carried by a user as the user enters the secured geographic area, a sensor of the security system that detects a threat within the secured geographic area, and a processor of the security system that transmits an evacuation map to the wireless portable device based upon the captured identifier, wherein the evacuation map depicts safe geographic exits from the secured geographic area on the evacuation map.

16 Claims, 7 Drawing Sheets

(56) References Cited

U.S. PATENT DOCUMENTS

| | | | | |
|---|---|---|---|---|
| 2015/0102936 A1* | 4/2015 | Vartiainen | .............. | G08B 7/066 |
| | | | | 340/691.6 |
| 2016/0007179 A1* | 1/2016 | Kim | ....................... | G08B 7/066 |
| | | | | 455/404.1 |
| 2016/0049064 A1* | 2/2016 | McNabb | ................ | G08B 21/10 |
| | | | | 340/540 |
| 2016/0110833 A1* | 4/2016 | Fix | ....................... | G06Q 50/265 |
| | | | | 705/324 |

OTHER PUBLICATIONS

UL Listed Digital Cellular Communication for Fire Alarm Control Panels, https://buy.dmp.com/dmp/products/documents/LT-1165,pdf, (4 pages), 2012, Dec. 2012.

\* cited by examiner

METHOD OF NOTIFICATION OF FIRE EVACUATION PLAN IN FLOATING CROWD PREMISES

FIELD

This application relates to public safety and, more particularly, to methods of evacuating public spaces.

BACKGROUND

Systems are known to evacuate people from public spaces in case of emergency. For example, a fire, a toxic gas leak, a bomb threat, or other risk to the safety or health of human occupants may necessitate the need for evacuation of a shopping mall or trade fair.

In some cases, the detection of a threat may simply result in the activation of one or more visual/audible alarms and notification of a local police and/or fire departments. People, upon hearing or seeing an alarm indicator, may simply evacuate a space. As police and fire personnel arrive, they may help direct the evacuation process.

Other systems may be based upon the use of one or more public address systems. Public address system(s) may be activated as needed and used to provide verbal directions in the event of an emergency.

In large areas covering many blocks, a separate public address system may be needed for each area. This may be necessary in order to avoid routing people across hazardous areas.

While such systems work relatively well, they are not always as effective as they should be. In some cases, the relative size of a public area may cause some people to think that the threat is limited to a nearby building.

In other areas with multiple public address systems, a message may be confusing. People hearing messages from neighboring public address systems may be confused as to which message to follow.

While some confusion is to be expected, the risk of death and/or injury in crowded public spaces may be extreme. Accordingly, a need exists for better methods of informing occupants of the need to evacuate such spaces.

DETAILED DESCRIPTION

Figure 1:
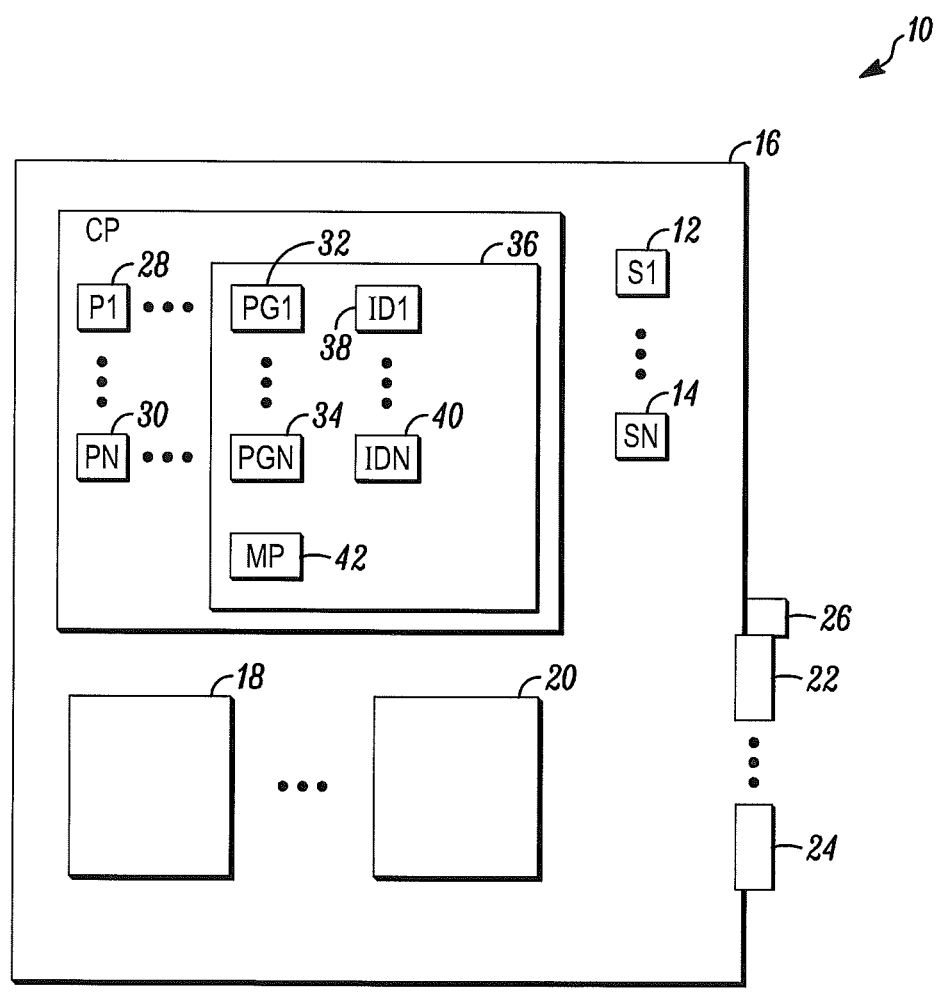
FIG. 1 is a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the security system are a number of sensors 12, 14 that detect threats within a secured geographic area 16.

The secured area may be any public or private space subject to large crowds of people. For example, it may be a shopping mall or a private auditorium used for trade shows.

The sensors may be embodied in any of a number of different forms intended for a threat to be detected. For example, at least some of the sensors may be fire detectors. Other of the sensors may be toxic gas detectors. Still other of the sensors may detect biologic threats.

Among the sensors may be one or more closed circuit television cameras (CCTVs) and associated circuitry for face recognition. An associated memory may contain images of terrorists or other criminals that can be compared with the images of people entering the secured area.

The sensors may be monitored by a control panel. Upon activation of one of the sensors, the control panel may activate a local alarm.

Associated with the secured area are a number of wireless portable devices (e.g., smartphones) 18, 20 carried by authorized human users of the secured area. In this regard, a periphery of the secured area includes a number of doors 22, 24 for entry and exit by authorized users into and out of the secured area. Associated with each of the doors is a reading device 26 based upon near field communications (NFC) or Bluetooth technology.

Included within the control panel may be a number of processor apparatuses (processors) 28, 30, each operating under control of one or more computer programs 32, 34 loaded from a non-transitory computer readable medium (memory) 36. As used herein, reference to a step performed by a computer program is also reference to a processor that executed that step.

As each user enters the secured area, a reading device reads an identifier (e.g., a telephone number) from the portable device carried by the user. As each identifier is read from the portable device, the identifier is saved into a respective file 38, 40.

Included within the control panel is an alarm processor that monitors each of the threat sensors. The alarm processor may also monitor one or more public safety and/or civil defense websites for indications of threats to public safety. For example, notifications of bomb threats, weather events, or threats of public disturbances may require evacuation of public spaces.

The secured area may also include one or more fire pull stations. Upon activation of one of the pull stations or sensors or upon notification of bomb or weather events, the alarm processor may enter an alarm state that requires evacuation of the secured area.

In order to notify users within the secured area of the need to evacuate, the alarm processor or a related processor may retrieve the identifiers saved in memory. Using the identifiers, the alarm processor may take steps to transfer a geographic map of the secured area to the portable devices of users to be evacuated. The alarm processor may do this directly or the alarm processor may simply send a communication system link (i.e., a hyperlink) that allows the users to retrieve the evacuation map.

In general, the map may display a geographic view of the secured area along with a clearly marked set of evacuation exits. Upon receiving the map, the users may view the map and proceed accordingly.

Under another illustrated embodiment, the system tracks the number of people within the secured area by retrieving identifiers of portable devices both upon entry into and upon exit from the secured area. In the case where the reading device is based upon NFC, the user may simply tap his/her cellphone against an ENTRY sign near an entrance to the secured area and against an EXIT sign near an exit to the area. In the case where the reading device uses Bluetooth, separate entry and exit turnstiles may be used. In this case, a Bluetooth reader near the entry turnstile detects entries and a Bluetooth reader near the exit turnstile detects exits.

Under this embodiment, as each identifier is detected upon entry into the secured area, the identifier is added to memory. As each user exits the secured area, the identifier is deleted from memory. In this way, the number of people within the secured area can be determined by the number of identifiers saved in memory.

Under another illustrated embodiment, the identifier contains a special pre-fix or suffix that identifies the portable device as being carried by a first responder (e.g., a fireman). In this case, the alarm processor or a special map processor transfers a copy of the map to the fireman. The processor may do this by transferring the map directly or a hyperlink to the map. The processor may also transfer an indicator of the number of people located within the secured area at that time.

In general, the system of FIG. 1 offers a number of advantages over conventional mass evacuation notification systems. For example, in places like shopping malls, auditoriums, airports, trade fares, etc., the visitors are always new. That is, the visitors are part of a floating cloud who are not familiar with the entries and exits. The real challenge arises when there is an emergency evacuation in places or subareas where the visitors are not aware of their location. Guiding a crowd to safe assembly areas and diverting them along a safe fire exit path is nearly impossible in the case of large crowds. Although mass notification systems are usually in place (e.g., public address (PA) systems, voice alarm systems, etc.), they are often not as effective as they should be because of a noisy environment (e.g., large numbers of people chatting, on-going conversations, people listening to music on their headphones, commercial announcements from local displays, etc.). This situation clearly conveys that an itemized, personalized, and individualized system of information transfer may help people to evacuation without confusion or sense of hurry.

The problem of evacuating massive crowds or floating occupants in public gathering areas is a significant challenge. PA and voice alarm systems are not very reliable in noisy environments. In addition, any solution must comply with the United Laboratories (UL) standard (UL-2572) recommended method for mass evacuations.

Figure 5:
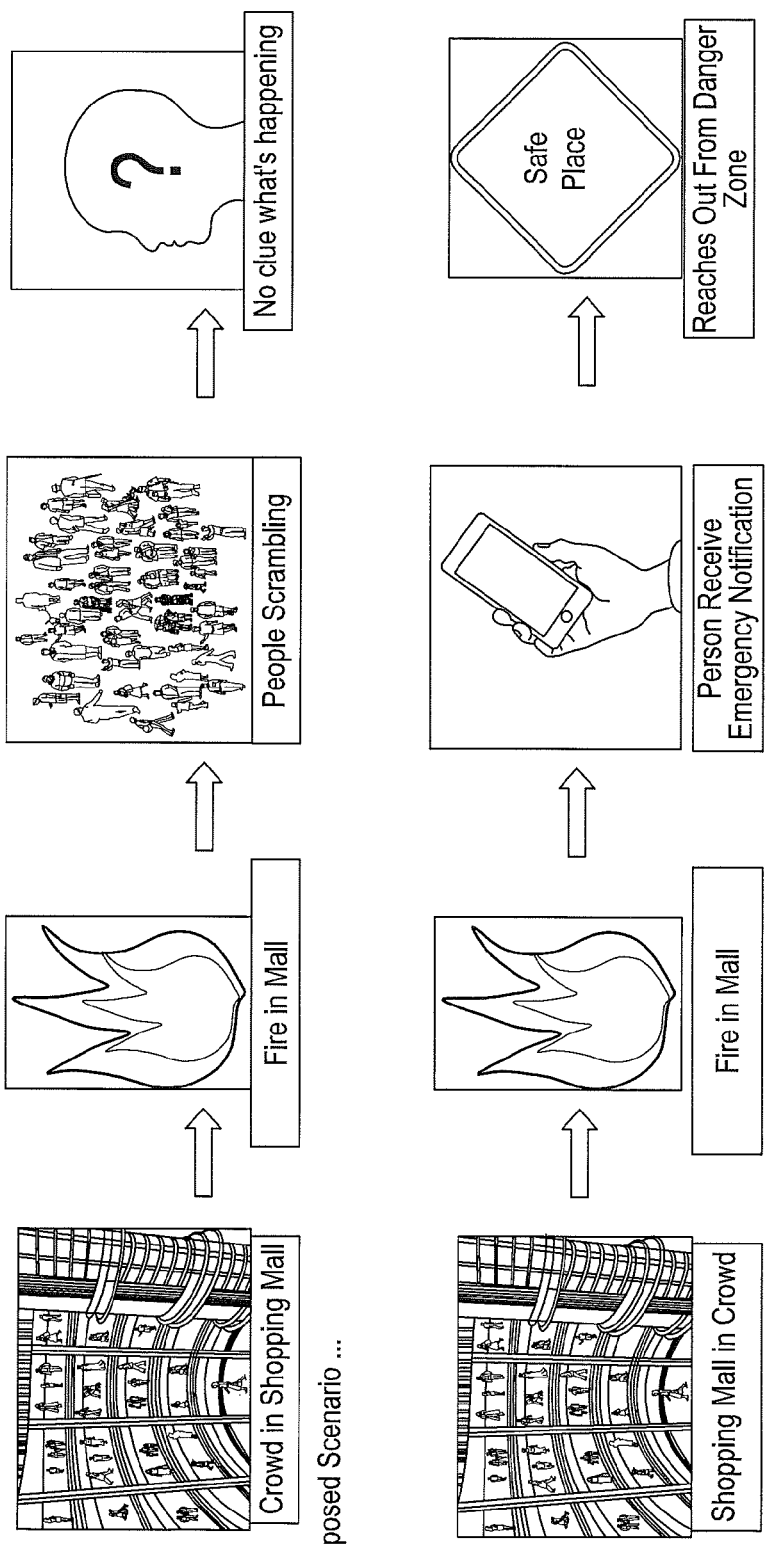
FIG. 5 is an information flow diagram that compares a conventional evacuation for a fire in an upper panel with an evacuation for a fire provided by the system of FIG. 1 in a lower panel.

A number of conventional systems have been proposed to address these problems. For example, at least some suppliers (e.g., EBI, BACnet, Modbus, etc.) have proposed stand-alone event monitoring stations providing client gateways with floor plans integrated with auto popups of fire locations. Another supplier has proposed the use of NFC stations near security check-ins at the point of entry of some premises and other NFC stations in across-the-floor locations of facilities. Other suppliers have proposed the use of data servers that could save visitor information and return URLs of floor plan information to the smart phones of visitors. Still other suppliers have provided systems to maintain a head count of visitors based upon closed circuit television (CCTV) and face detection algorithms that detect the entry and exit of visitors. However, none of the prior art systems provide customized information to individual users. This results in the confusion depicted in the upper panel of FIG. 5.

Figure 2:
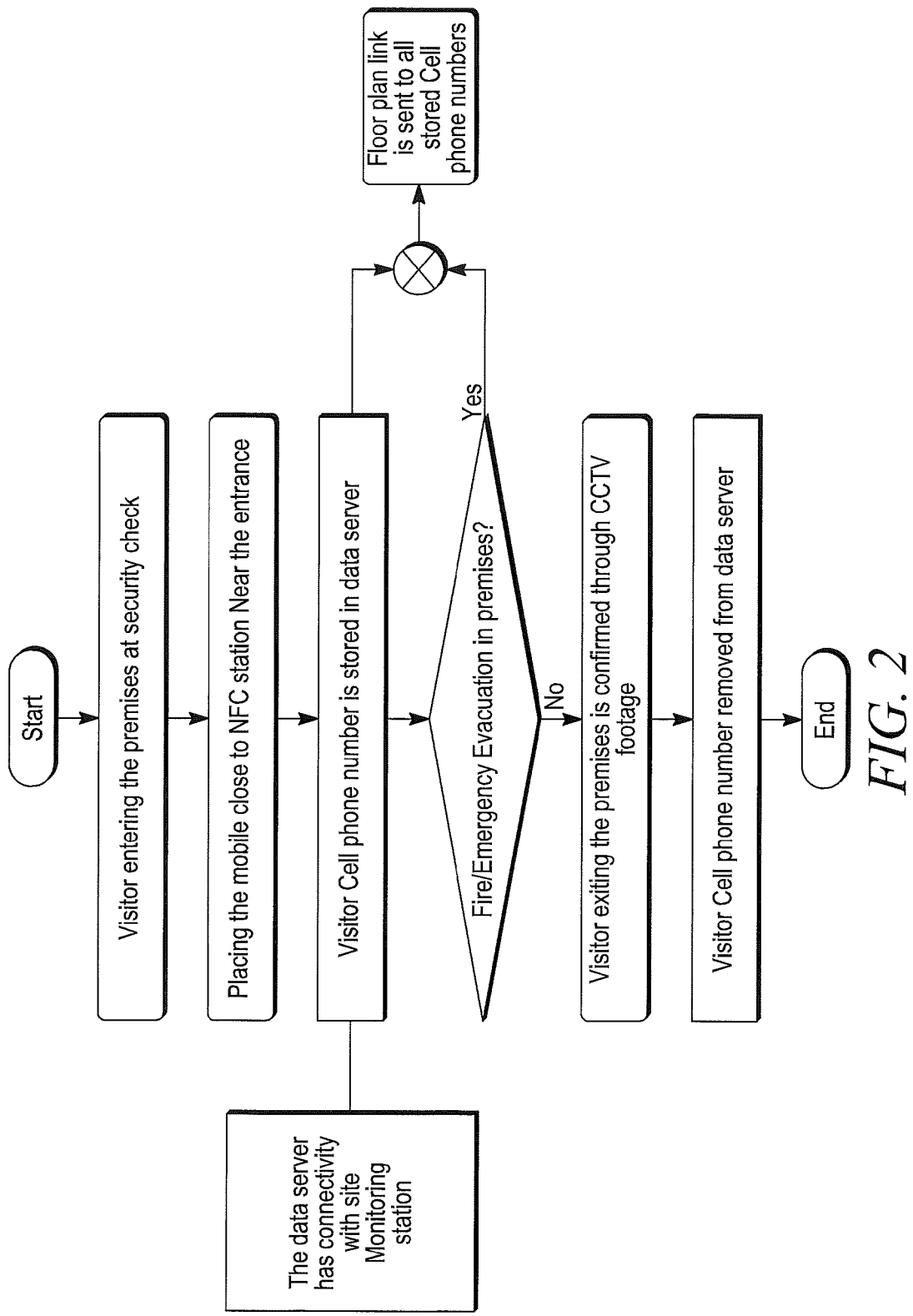
FIG. 2 is a flow chart of steps that may be followed by the system of FIG. 1.
Figure 3:
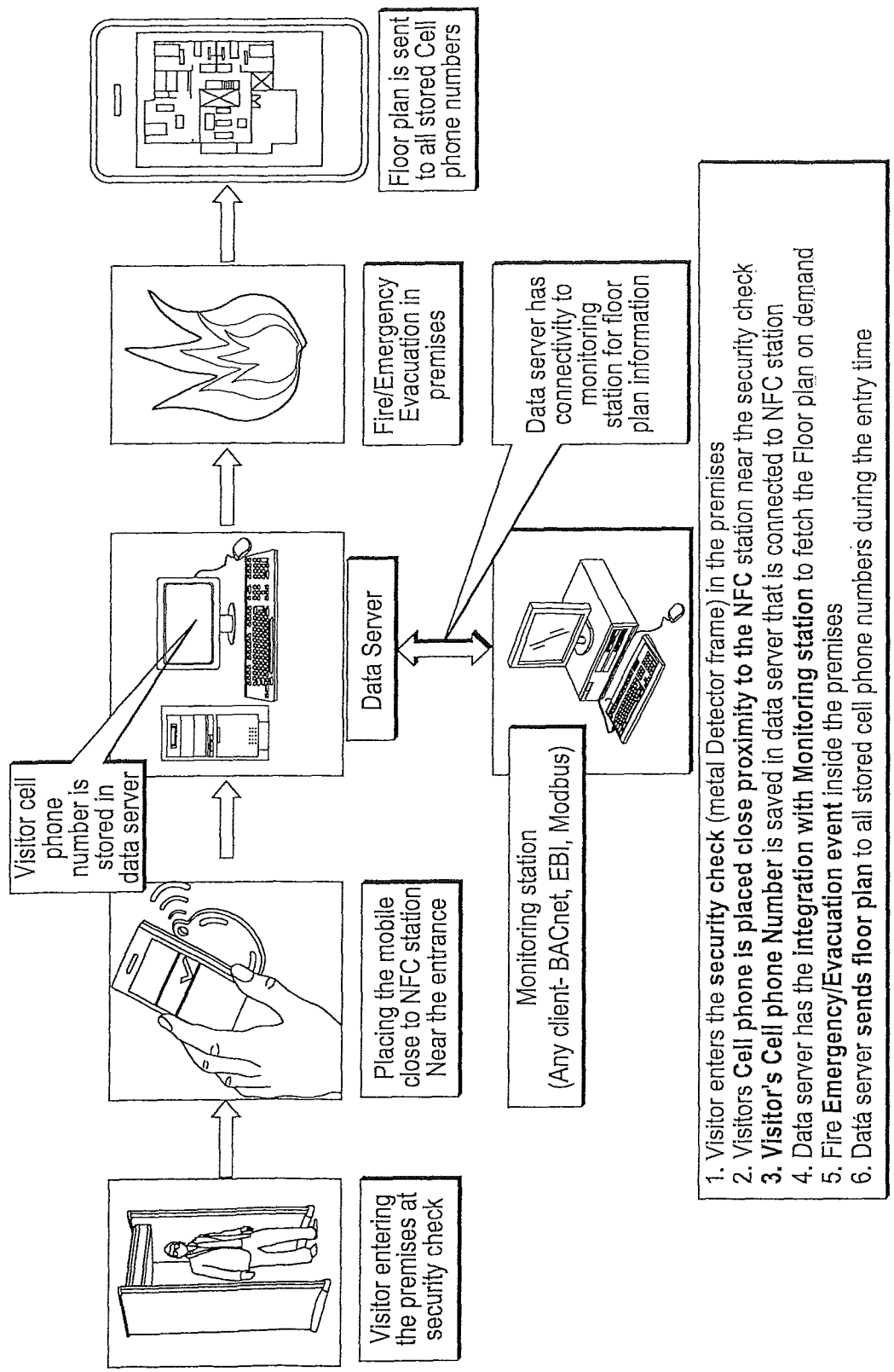
FIG. 3 is a flow chart of a more detailed set of steps that may be followed by the system of FIG. 1.
Figure 4:
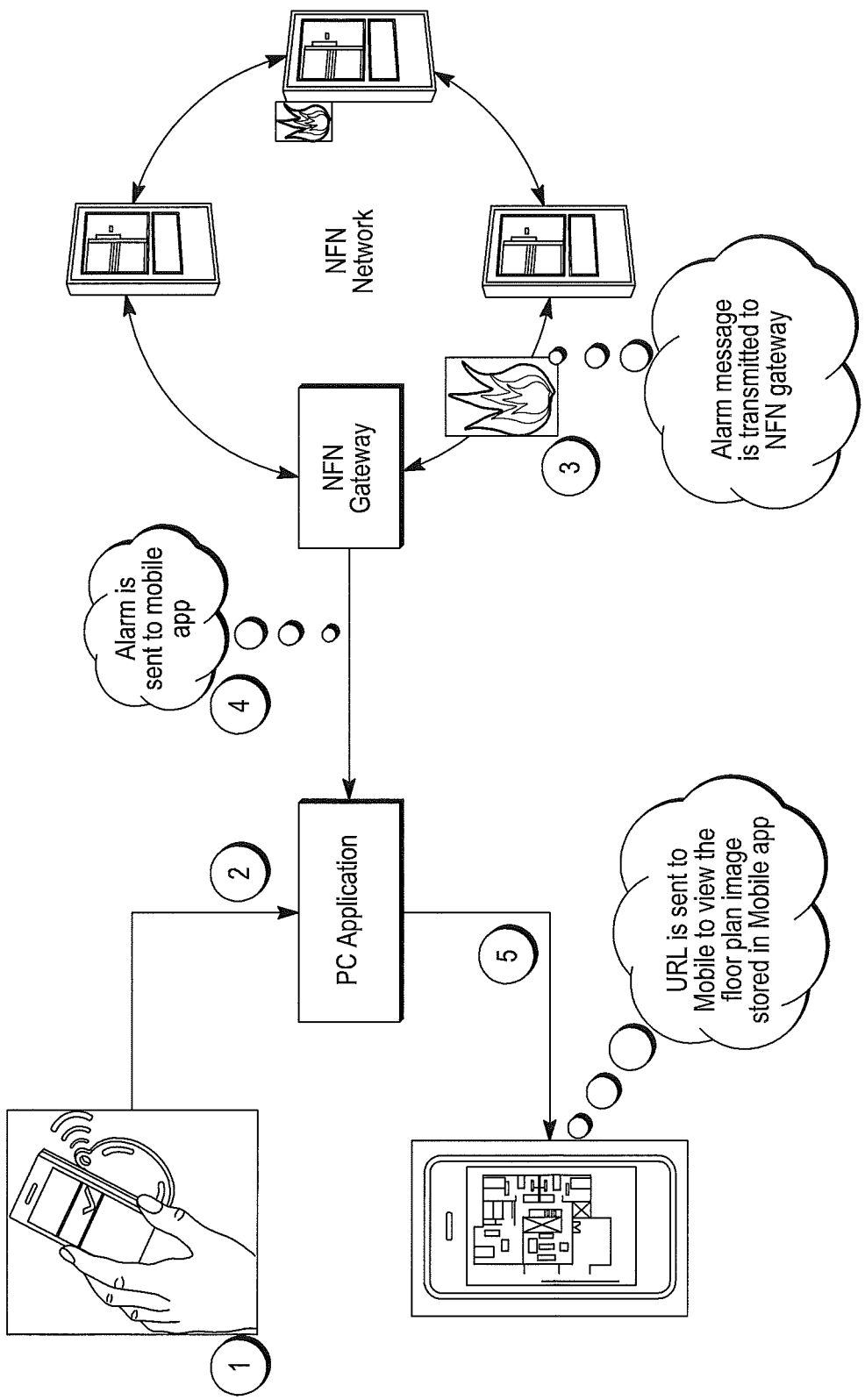
FIG. 4 is an information flow diagram of the system of FIG. 1.

In contrast, one embodiment of the system of FIG. 1 operates by capturing a visitor's cell phone number through NFC technology. An NFC station with a data storage server is installed near the entrance of the premises as shown in the diagrams of FIGS. 2 and 3. Visitors may use this system while entering the premise during security check-in. Under this embodiment, the cell phone of the visitor may be tapped on the NFC station. In response, the NFC station acquires the visitor's cell phone number and saves it into the data storage server. The NFC data storage server has connectivity to an event monitoring station (e.g., the security system), which has floor plan information and a processor that sends the floor plan information to the visitor upon detection of an event (e.g., a fire) as shown in FIG. 4. NFC stations are installed in various locations on the floors of the secured area and are connected with the data storage server. In the event of a fire emergency or other need for evacuation, the data storage server sends a URL (i.e., a web link) to the saved cell phone numbers. The URL navigates a processor of the cell phone to the data storage server and displays the floor plan on the cell phone screen. The floor plan is displayed with safe exit routes (pre-configured) for different points of entry onto the floors. Visitors at any corner of the floor/building can later tap their cell phone on any nearby NFC stations to register for evacuation maps tailored to their then-current location. A URL from the server is sent to the cell phone by the NFC station that contains information for a safe exit from the current tapped location. This is shown in the lower panel of FIG. 5.

As illustrated in FIG. 2, entry authentication to an evacuation system is accomplished via the visitor's cell phone number. Registration of the visitor is accomplished by the visitor tapping the cell phone on the NFC station at an entry point during a security check. Visualization of the floor plan/evacuation plan/safe exit route is provided by means of the cell phone through a personalized map shown on a device display. This is accomplished by sending a URL that gives access to the floor plan of the building and sent to cell phone numbers stored in the data storage server.

Upon the occurrence of an evacuation event, a status request is sent to visitors at pre-determined time intervals to request (and obtain) "escaped" or "trapped" information from the visitor. An escaped or safely exited confirmation message is obtained from the visitors after they have been safely evacuated from the emergency.

Under normal conditions (non-emergency), visitor exit confirmation is obtained by matching CCTV footage (i.e., a face image of the visitor at the time of entry) with images at the time of an NFC tapping event detected during the exit. At the time of exit, the corresponding exit is validated by matching images and, in response, the cell phone number is removed from the data storage server for exit authentication. As such, mass notifications and evacuation messages are accomplished automatically through cell phone messages and notifications. This solution is in compliance with the UL2572 Mass Notification Standard.

A number of enhancements may also be made to the above embodiments. For example, the NFC station may be integrated with arrival of first responders or first vision units. In this case, a fire fighter taps his/her portable device (smart phone/PDA/iPad/tablet), and the system immediately provides a link to the floor plan of the secured area. The floor plan indicates the location of a fire inside of the building and later remains on the screen of the portable device to help the fire fighter reach the location instead of having to remember the floor plan along the way.

Figure 6:
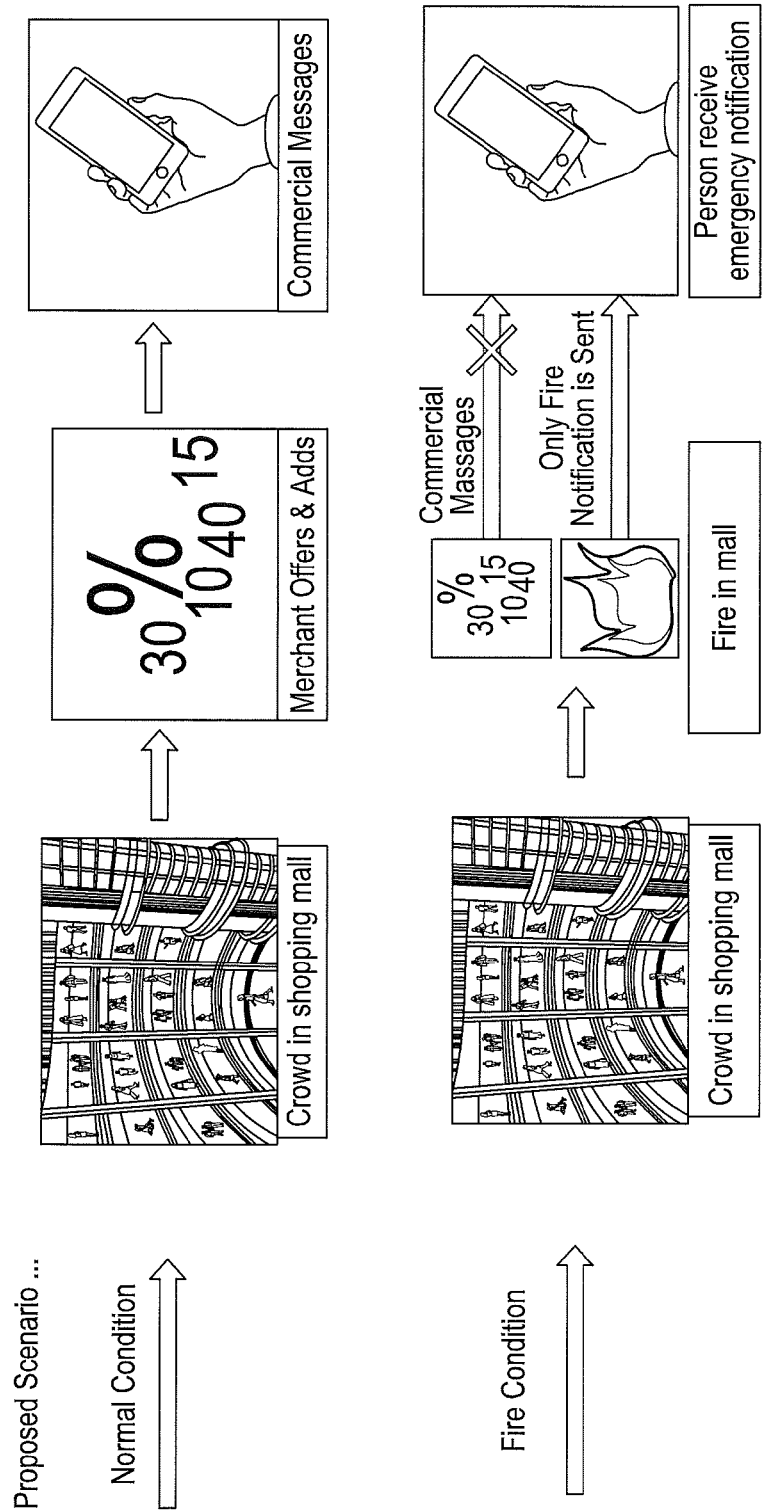
FIG. 6 is an information flow diagram that compares a conventional system for commercial messages with the system of FIG. 1 where the conventional method is shown in an upper panel and message flow provided by the system of FIG. 1 is shown in a lower panel.

Another enhancement may reduce distractions. For example, in commercial buildings (e.g., shopping malls), the shops or stalls often transmit ads for discount sales, offers, and other promotional information as shown in the upper panel of FIG. 6. These ads are sent to mobile phones to the extent that delivery of the ad would cover the commercial usage points in front of or near the shop or stall. In the event of an emergency, only the floor plan map/link are sent to cell phones as shown in the lower panel of FIG. 6. All commercial ads and links are restricted until the situation/system is brought back to a normal state.

Figure 7:
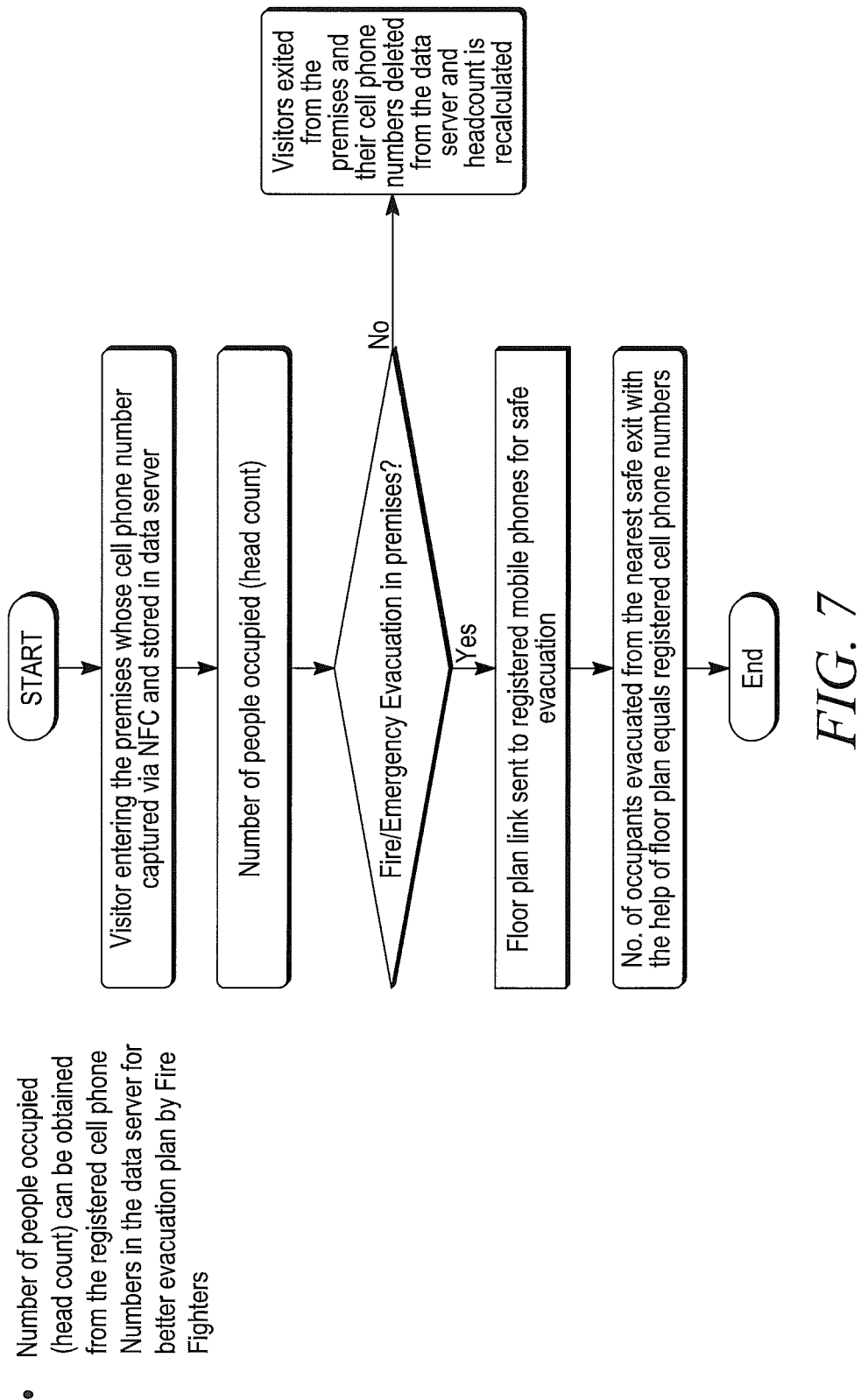
FIG. 7 is a flow chart of a method for obtaining a head count in the system of FIG. 1.

In another aspect (mentioned above), the number of people occupying the secured area (head count) can be obtained from the number of registered cell phones in the data storage server for better evacuation planning by fire fighters as shown in FIG. 7. In addition, suspects or criminals can be more easily identified using the CCTV footage when a person fails to tap on the NFC station and a snap shot (face image) is available.

In another aspect (mentioned above), Bluetooth sensors may be used in place of the NFC station to serve the same methodology to capture the mobile numbers. The same infrastructure is used as in FIG. 3 where the NFC station is replaced or supplemented by a Bluetooth device. This solution is available for cell phones that do not support NFC technology. The tracking of precise locations of each person is relatively simple (by discovering the cell phones in range of the Bluetooth sensors provided at any location within the premises).

In addition, the problem of "man down" is handled efficiently by locating the last Bluetooth sensor that was in range. The exit and the deletion of cell phone numbers from the system is handled automatically by detecting any person who has come within range and passed a Bluetooth sensor at an exit.

In general, the system includes a security system that protects a secured geographic area, a near field or Bluetooth device proximate an entry of the secured geographic area that captures an identifier of a wireless portable device carried by a user as the user enters the secured geographic area, a sensor of the security system that detects a threat within the secured geographic area and a processor of the security system that transmits an evacuation map to the wireless portable device based upon the captured identifier, wherein the evacuation map depicts safe geographic exits from the secured geographic area on the evacuation map.

Alternatively, the system includes a security system that protects a secured geographic area, a plurality of wireless portable devices each carried by a respective human user, a near field or Bluetooth device proximate an entry of the secured geographic area that captures identifiers of each of the plurality of wireless portable devices as the respective human user enters the secured geographic area and saves the captured identifier in a database, a sensor of the security system that detects a threat within the secured geographic area, and a processor of the security system that transmits an evacuation map to each of the plurality of wireless portable devices within the database, wherein the evacuation map depicts a route to safe geographic exits from the secured geographic area on the evacuation map.

Alternatively, the system includes a security system that protects a secured geographic area, a plurality of wireless portable devices each carried by a respective human user, a near field or Bluetooth device proximate an entry of the secured geographic area that captures an identifier of each of the plurality of wireless portable devices, saves the identifier in a database as each of the plurality of wireless portable devices enters the secured geographic area, and deletes the corresponding identifier as each of the plurality of wireless portable devices exits the secured geographic area, a sensor of the security system that detects a threat within the secured geographic area and a processor of the security system that transmits an evacuation map to each of the plurality of wireless portable devices within the database, wherein the evacuation map depicts a route to a safe geographic exits from the secured geographic area on the evacuation map.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be add to or removed from the described embodiments.

The invention claimed is:

1. An apparatus comprising:
a security system that protects a secured geographic area;
a near field or Bluetooth device proximate the secured geographic area that captures an identifier of a wireless portable device as the wireless portable device enters the secured geographic area and that captures the identifier of the wireless portable device as the wireless portable device exits the secured geographic area;
a sensor of the security system that detects a threat within the secured geographic area; and
a processor of the security system that saves, in a database, the identifier of the wireless portable device as the wireless portable device enters the secured geographic area, that deletes, from the database, the identifier of the wireless portable device as the wireless portable device exits the secured geographic area after confirming that the wireless portable device has exited the secured geographic area, and that transmits an evacuation map to the wireless portable device based upon the identifier of the wireless portable device captured when the sensor detects the threat,
wherein the evacuation map depicts safe geographic exits from the secured geographic area on the evacuation map,
wherein the processor of the security system matches an entry image captured as the wireless portable device enters the secured geographic area to an exit image captured as the wireless portable device exits the secured geographic area to confirm that the wireless portable device has exited the secured geographic area when the sensor does not detect the threat, and
wherein the processor of the security system periodically sends a status request to the wireless portable device to confirm that the wireless portable device has exited the secured geographic area when the sensor detects the threat.

2. The apparatus as in claim 1 wherein the processor of the security system determines a number of people within the secured geographic area based upon a number of saved identifiers in the database.

3. The apparatus as in claim 2 wherein, when the identifier includes a special indicator that identifies the wireless portable device as being carried by a first responder arriving at the secured geographic area in response to the threat, the processor of the security system downloads, to the wireless portable device, the evacuation map of the secured geographic area along with an indication of the threat superimposed over the evacuation map.

4. The apparatus as in claim 3 wherein the processor of the security system notifies the first responder of the number of people within the secured geographic area at risk due to the threat.

5. The apparatus as in claim 1 wherein the processor of the security system downloads a universal resource locator (URL) of the processor of the security system to the wireless portable device.

6. The apparatus as in claim 5 wherein a processor of the wireless portable device transmits a map request to the security system.

7. The apparatus as in claim 1 wherein the identifier comprises a telephone number of the wireless portable device.

8. An apparatus comprising:
a security system that protects a secured geographic area;
a plurality of wireless portable devices;
a near field or Bluetooth device proximate an entry of the secured geographic area that captures a respective identifier of a respective one of the plurality of wireless portable devices as the respective one of the plurality of wireless portable devices enters the secured geographic area, that saves, in a database, the respective identifier as the respective one of the plurality of wireless portable devices enters the secured geographic area, and that deletes, from the database, the respective identifier as the respective one of the plurality of wireless portable devices exits the secured geographic area after confirming that the respective one of the plurality of wireless portable devices has exited the secured geographic area;
a sensor of the security system that detects a threat within the secured geographic area; and
a processor of the security system that transmits an evacuation map to each of the plurality of wireless portable devices identified within the database when the sensor detects the threat,
wherein the evacuation map depicts a route to safe geographic exits from the secured geographic area on the evacuation map,
wherein the processor of the security system matches a respective entry image captured as the respective one of the plurality of wireless portable devices enters the secured geographic area to a respective exit image captured as the respective one of the plurality of wireless portable devices exits the secured geographic area to confirm that the respective one of the plurality of wireless portable devices has exited the secured geographic area when the sensor does not detect the threat, and
wherein the processor of the security system periodically sends a status request to the respective one of the plurality of wireless portable devices to confirm that the respective one of the plurality of wireless portable devices has exited the secured geographic area when the sensor detects the threat.

9. The apparatus as in claim 8 wherein the processor of the security system determines a number of people within the secured geographic area based upon a number of saved identifiers in the database.

10. The apparatus as in claim 9 wherein, when the respective identifier includes a special indicator that identifies the respective one of the plurality of wireless portable devices as being carried by a first responder arriving at the secured geographic area in response to the threat, the processor of the security system downloads, to the respective one of the plurality of wireless portable devices, the evacuation map of the secured geographic area along with an indication of the threat superimposed over the evacuation map.

11. The apparatus as in claim 10 wherein the processor of the security system notifies the first responder of the number of people within the secured geographic area at risk due to the threat.

12. The apparatus as in claim 8 wherein the processor of the security system downloads a universal resource locator (URL) of the processor of the security system to the respective one of the plurality of wireless portable devices.

13. The apparatus as in claim 8 wherein a respective processor of each of the plurality of wireless portable devices transmits a map request to the security system.

14. The apparatus as in claim 8 wherein the identifier comprises a telephone number of the respective one of the wireless portable devices.

15. An apparatus comprising:
a security system that protects a secured geographic area;
a plurality of wireless portable devices;
a near field or Bluetooth device proximate an entry of the secured geographic area that captures a respective identifier of each of the plurality of wireless portable devices, saves, in a database, the respective identifier of a respective one of the plurality of wireless portable devices as the respective one of the plurality of wireless portable devices enters the secured geographic area, and deletes, from the database, the respective identifier as the respective one of the plurality of wireless portable devices exits the secured geographic area after confirming that the respective one of the plurality of wireless portable devices has exited the secured geographic area;
a sensor of the security system that detects a threat within the secured geographic area; and
a processor of the security system that transmits an evacuation map to each of the plurality of wireless portable devices identified within the database when the sensor detects the threat,
wherein the evacuation map depicts a route to safe geographic exits from the secured geographic area on the evacuation map,
wherein the processor of the security system matches a respective entry image captured as the respective one of the plurality of wireless portable devices enters the secured geographic area to a respective exit image captured as the respective one of the plurality of wireless portable devices exits the secured geographic area to confirm that the respective one of the plurality of wireless portable devices has exited the secured geographic area when the sensor does not detect the threat, and
wherein the processor of the security system periodically sends a status request to the respective one of the plurality of wireless portable devices to confirm that the respective one of the plurality of wireless portable devices has exited the secured geographic area when the sensor detects the threat.

16. The apparatus as in claim 15 wherein, when the respective identifier includes a special indicator that identifies the respective one of the plurality of wireless portable devices as being carried by a first responder arriving at the secured geographic area, the processor of the security system downloads, to the respective one of the plurality of wireless portable devices, the evacuation map of the secured geographic area along with an indication of the threat superimposed over the evacuation map.

* * * * *